US012732035B2

(12) United States Patent
Smith et al.

(10) Patent No.: US 12,732,035 B2
(45) Date of Patent: Sep. 8, 2026

(54) ELECTRIC MACHINE COOLING OF STATOR END WINDINGS

(71) Applicant: Rolls-Royce North American Technologies, Inc., Indianapolis, IN (US)

(72) Inventors: Alan W. Smith, Indianapolis, IN (US); Patrick Gore, Indianapolis, IN (US); Peter Gegg, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 236 days.

(21) Appl. No.: 18/482,698

(22) Filed: Oct. 6, 2023

(65) Prior Publication Data

US 2025/0119004 A1 Apr. 10, 2025

(51) Int. Cl.
*H02K 1/20* (2006.01)
*H02K 3/24* (2006.01)
*H02K 15/08* (2006.01)

(52) U.S. Cl.
CPC ................. *H02K 1/20* (2013.01); *H02K 3/24* (2013.01); *H02K 15/08* (2013.01)

(58) Field of Classification Search
CPC ................................... H02K 1/20; H02K 3/24
See application file for complete search history.

(56) References Cited

U.S. PATENT DOCUMENTS 7,208,854 B1 4/2007 Saban et al.
9,099,900 B2 8/2015 Glubrecht
2002/0074870 A1* 6/2002 Vandervort .............. H02K 9/00 310/58
2013/0076170 A1* 3/2013 Adra ........................ H02K 3/24 310/59
2017/0244306 A1 8/2017 Lin et al.
2020/0106342 A1 4/2020 Chatterjee et al.
2022/0190664 A1* 6/2022 Mandel .................. H02K 9/193
2022/0251971 A1 8/2022 Pazinski et al.
2023/0150683 A1* 5/2023 Chong ................... H02K 9/197 244/53 R

* cited by examiner

*Primary Examiner* — Tulsidas C Patel
*Assistant Examiner* — Robert E Mates
(74) *Attorney, Agent, or Firm* — Shumaker & Sieffert, P.A.

(57) ABSTRACT

An example electric machine includes a rotor and a stator. The stator includes a stator core defining a longitudinal axis and a plurality of stator end windings extending from the stator core along the longitudinal axis. Adjacent end windings of the plurality of stator end windings define a radial gap, and the radial gap is configured to allow a cooling fluid to flow within the radial gap and in contact with the adjacent stator end windings.

16 Claims, 6 Drawing Sheets

ELECTRIC MACHINE COOLING OF STATOR END WINDINGS

This invention was made with Government support under Grant Contract Number FA8650-19-D2078 awarded by Air Force Research Laboratory (AFRL). The Government has certain rights in the invention.

TECHNICAL FIELD

The disclosure relates to electric machine cooling.

BACKGROUND

Cooling may be used to remove heat generated within rotating machinery. Heat may be generated within rotating machinery via resistance of the windings, eddy currents, and hysteresis induced losses. Heat removal from rotating machinery may be critical for rotating machinery whose failure would be highly detrimental to operations.

SUMMARY

This disclosure describes a cooling system and techniques configured to cool an electric machine. As one example, a stator may include a stator core defining a longitudinal axis and a plurality of windings of an electrically conductive material wound about the stator core. The plurality of windings may be radially layered such that a plurality of layers of end windings extend from the stator core in the longitudinal direction, and adjacent layers of end windings define radial gaps between the adjacent layers. The radial gaps may be configured to allow a cooling fluid to flow within the radial gaps and in contact with the adjacent radial layers of end windings. The radial gaps may be controlled to have a substantially uniform gap distance such that the cooling fluid may cool the plurality of radial layers of end windings uniformly in the radial and circumferential directions, e.g., thereby reducing hot spots and reducing an overall temperature variation of the end windings.

In one example, this disclosure describes an electric machine including: a rotor; and a stator including: a stator core defining a longitudinal axis; and a plurality of stator end windings extending from the stator core along the longitudinal axis, wherein adjacent end windings of the plurality of stator end windings define a radial gap, wherein the radial gap is configured to allow a cooling fluid to flow within the radial gap and in contact with the adjacent stator end windings.

In another example, this disclosure describes a method of making an electric machine, the method including: winding a plurality of layers of electrically conductive windings about a stator core, the stator core defining a longitudinal axis, wherein each layer of the plurality of layers of electrically conductive windings comprises an end winding layer extending from the stator core in the longitudinal direction; and positioning a spacer between adjacent end winding layers of the plurality of end winding layers, wherein a spacer defines a radial gap distance between the adjacent end winding layers.

In another example, this disclosure describes a stator including: a stator core defining a longitudinal axis; and a plurality of radial layers of stator end windings extending from the stator core in the longitudinal direction, wherein adjacent radial layers of the plurality of radial layers of stator end windings define a plurality of radial gaps, wherein the plurality of radial gaps are configured to allow a cooling fluid to flow within the plurality of radial gaps and in contact with the adjacent stator end windings.

The details of one or more examples are set forth in the accompanying drawings and the description below. Other features, objects, and advantages will be apparent from the description and drawings, and from the claims.

DETAILED DESCRIPTION

Figure 1:
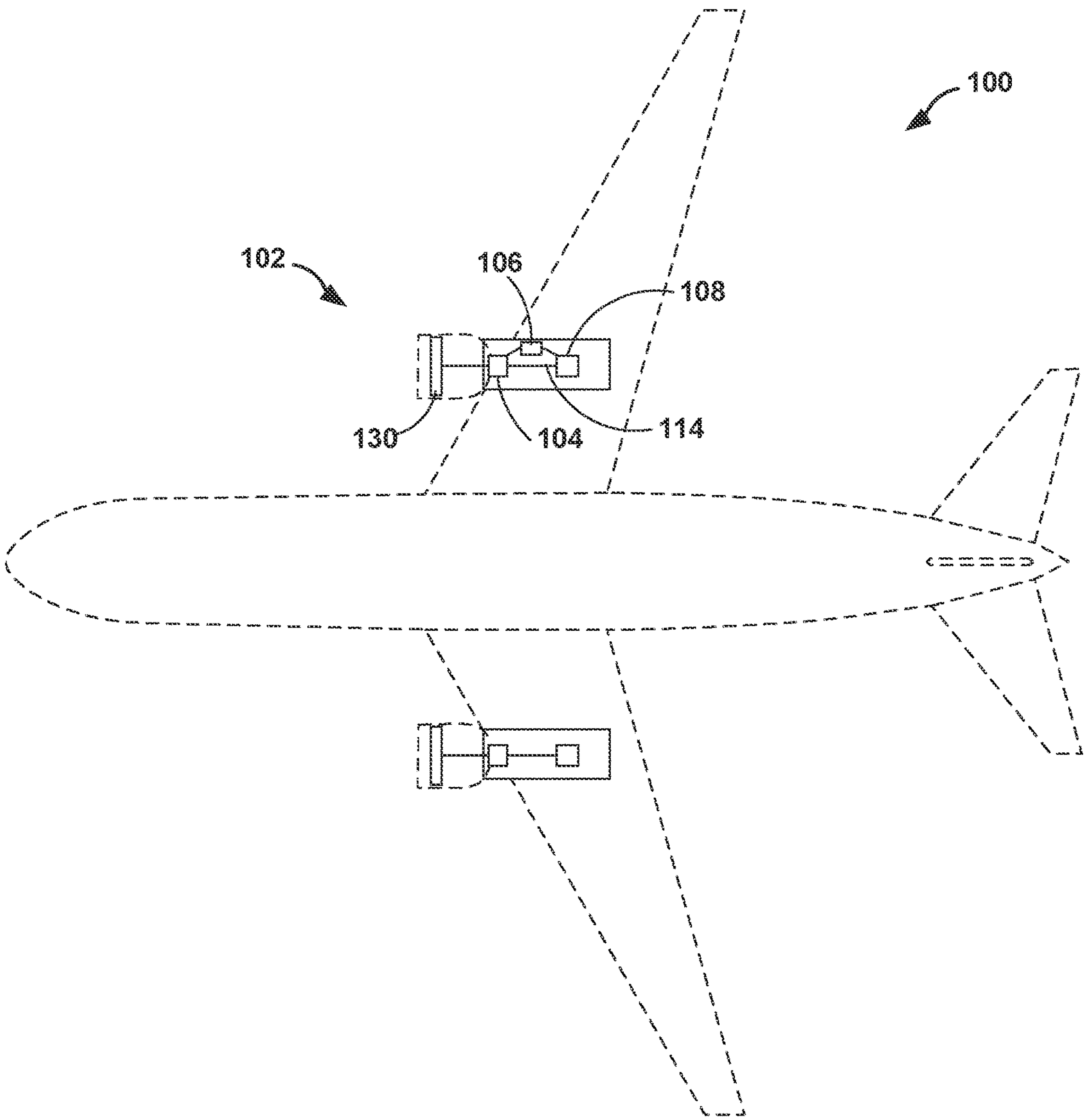
FIG. 1 is a conceptual diagram of a vehicle that includes an electric machine, in accordance with one or more techniques of this disclosure.

Electric machines convert electrical energy to mechanical energy or vice versa. As one example, an electric machine may operate as a generator that converts mechanical energy into electrical energy. As another example, an electric machine may operate as an electric motor that converts electrical energy into mechanical energy. Electric machines typically include a rotor that rotates within or around a stator. Energy flows through the stator to or from the rotor. In an electric motor, the stator provides a varying magnetic field that drives the rotor. In a generator, the stator converts the rotating magnetic field of the rotor to electric energy.

Electrical machines may be used for the purpose of electrical power generation on aircraft to help meet volume and weight restrictions for aerospace applications. Electric power may be used for propulsion of a vehicle, such as an aircraft, or to supply on-board electrical loads. High power density machines may require an effective means of removing heat that is generated within the stator and rotor. Heat generated within the electric machine may be due to electrical resistance of the windings and eddy current and hysteresis induced losses in permanent magnets. In some examples, the stator of an electric machine may include the windings, and the rotor may include the permanent magnets. In some examples described herein, an electric machine may use alternating current or direct current. In some examples, an electric machine may be a field wound machine with exciter windings, a switched reluctance machine, an induction motor or generator, or the like. In some examples, an electric machine may include an engine mounted motor and/or generator, e.g., an electric machine mounted to a gas turbine engine, a reciprocating engine, or the like. In some examples, an electric machine may include an embedded electric machine. For example, an electric machine may be an automotive motor, or other transportation vehicle motors, such as a propulsion motor, a motor configured to drive a fans, a compressor, a pump, a centrifuge, a hoist or the like, and/or an electric machine may be a generator configured to be driven by a turbine, a windmill, or any suitable apparatus configured to provide torque to the rotor of the electric machine operating as a generator.

The power density of electrical machines may be at least partially determined by the temperature capability of the machine components, such as magnets and windings (e.g., the electrically conductive windings). For example, electrical current of the windings (or "winding current") may be limited to avoid overheating the windings and thereby avoiding failure of the machine. In some machines, windings may be cooled by flooding winding cavities with a fluid, such as a flowing oil within winding cavities. However, there may be significant variability in flow passages through the windings and surrounding cavities, which may result in significant uncertainty and variability in the flow of the fluid (e.g., oil) "local" to the windings, e.g., about, adjacent to, in contact with, or substantially near the windings. In some examples, the variability in flow of the fluid may cause and/or enable local hot spots in the electrical machine, e.g., localized within a portion of one or more windings, such as end windings. Any hot spots in the machine may be the first point to fail due to a temperature exceedance, due to for example insulation breakdown at that location. Hot spots may limit machine capability or reliability, e.g., by having to over-design for cooling or under-design machine output so as to avoid overheating at the hot spots.

In accordance with examples disclosed herein, this disclosure describes systems, devices, and techniques for cooling an electric machine. In some examples, an electric machine may be configured to cool end windings, e.g., stator end windings, via providing radial gaps to allow a cooling fluid to flow within the radial gaps and in contact with the end windings. Parts of the end windings may not be able to dissipate heat as quickly or as efficiently as other portions of the end windings due to lack of contact with the cooling fluid, allowing hot spots to occur at the end windings. For example, the windings (including the end windings or end portions of the windings) may be tightly wound and/or packed, and a cooling fluid may have reduced or no flow over, or contact with, portions of the windings In some examples, an electric machine with radial gaps between radially adjacent end windings provide a path for a cooling fluid to flow that would otherwise only be able to contact a portion (e.g., outer surfaces) of the end windings without such gaps. An electric machine with radial gaps between adjacent end windings may provide for more uniform cooling, reducing hot spots in the windings, particularly at the end windings.

In some examples, an electric machine with radial gaps configured for substantially uniform flow of the fluid through the end windings, e.g., radial gaps having sizes and spacings between gaps to allow the same volume and/or rate of fluid flow as a function of radial and/or circumferential position of the end windings. In some examples, such radial gaps may have substantially the same gap size (or cross-sectional area) and may be spaced regularly. In other examples, the gap size (e.g., cross-sectional areas) may increase or decrease as a function of radial position and the gap spacings may increase or decrease as a function of radial position, e.g., so as to result in substantially uniform flow of the fluid in the end windings as a function of the local surface area and/or mass of the end windings as a function of radial position, ultimately resulting in uniform local cooling fluid temperatures. Such substantially uniform cooling fluid flow and temperature as a function of radial and/or circumferential position within the windings, and particularly within the end windings, may improve the flow of the fluid in the stator portion, which may improve the efficiency and amount of heat transferred to the fluid. For example, such substantially uniform cooling fluid flow and temperature may improve heat transfer amount and/or efficiency, e.g., by reducing quiescent or stagnant coolant flow zones and/or portions where lack of fluid velocity allows the heat to build up and reduced coolant velocity reduces the heat transfer from the adjacent windings. For example, the radial gaps may be configured to increase the surface area of the end windings that contact the fluid, equalize fluid temperatures local to the end windings, increase the flow rate of the fluid for a given pressure drop, promote turbulent flow of the fluid near or about the end windings, and avoid or reduce coolant zones with quiescent or stagnant coolant where convective heat transfer is significantly reduced.

In some examples, the radial gaps may be configured to control the flow rate and/or fluid velocity within the windings and end windings, e.g., to an optimal velocity. For example, if the fluid flows too slowly, the rate of heat transfer may be reduced relative to the optimum velocity, and if the fluid flows to quickly, the pressure drop will be excessive relative to the optimum velocity. In some examples, controlled radial gaps, and/or substantially uniform radial gaps, may improve the uniformity of heat transferred to the fluid and may distribute the heat more uniformly in the volume of fluid flowing within the stator portion, which may further reduce hot spots in the windings, and particularly the end windings, and may further improve the efficiency of heat transfer to the fluid and the efficiency or power density of the machine.

In some examples, an electric machine may include axial, radial, and circumferential gaps and/or passages within flooded end windings and may be configured to control the flow rate and velocity of a cooling fluid and to control the axial, radial, and circumferential symmetry and/or uniformity of cooling by the cooling fluid of the windings and the end windings. In some examples, the electric machine may include gaps and and/or passages configured to control the flow of the fluid with a relatively low pressure drop and an increased cooling efficiency, e.g., an improved rate of heat transfer to the fluid, heat removal from the windings and end windings, and a reduction in hot spots and/or overall temperature variations as a function of axial, radial, and circumferential position of the windings and/or end windings. In some examples, the gaps and/or passages may be configured to improve the cooling efficiency of the windings and/or end windings and improve the reliability, size, weight, power density, and/or cost of the electric machine.

In some examples, electric machines described herein may be disposed on or for use with a vehicle, or may disposed on or for use with a static, or nonmoving, application. For example, although described below in the context of vehicle 100, electric machine 108 may be an electric machine of a powerplant, a static or portable motor/generator, an electric machine of a pipeline such as a water, oil, or gas pipeline, or for use in any suitable context in which a motor/generator may be used.

FIG. 1 is a conceptual diagram of a vehicle 100 that includes an electric machine, in accordance with one or more techniques of this disclosure. In some examples, vehicle 100 includes an aircraft. In other examples, vehicle 100 may include any type of vehicle utilizing an electric machine, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 100 may be manned, semiautonomous, or autonomous.

As shown in the example of FIG. 1, vehicle 100 includes a propulsion system 102. In some examples, propulsion system 102 may include a combustion engine, such as a gas turbine engine 104. In the example shown, gas turbine engine 104 is configured to drive a propulsor 130. Some propulsion systems that include gas turbine engines may include an electric machine 108. In some examples, electric machine 108 may be an electric starter/generator (ESG) that may both start gas turbine engine 104 and generate electrical power using mechanical energy generated by gas turbine engine 104. In the example shown, electric machine 108 is coupled to gas turbine engine 104 via shaft 114. In some examples, electric machine 108 may be a generator which provides electrical power to the aircraft and/or engine accessories or components. For example, electric machine 108 may be a generator configured to provide electrical power to a battery, and the battery may be configured to provide electrical power to the aircraft. In some examples, electric machine 108 may be an electric motor that is configured to drive propulsor 130, e.g., rather than gas turbine engine 104 being mechanically coupled to and driving propulsor 130. For example, electric machine 108 may be a motor/generator electrically connected to a battery configured to provide electrical power to electric machine 108 (e.g., to drive propulsor 130) or to receive electrical power from electrical machine 108 functioning as a generator. In some examples, electric machine 108 and a gas turbine engine may be located and/or mounted anywhere on the aircraft, e.g., the fuselage. In some examples, any of electric machine 108, and a gas turbine engine may be mechanically coupled to propulsor 130, e.g., either one or both of an electric motor and a gas turbine engine may drive propulsor 130.

In accordance with one or more techniques of this disclosure, vehicle 100 may include components configured to cool and/or remove heat from electric machine 108. For instance, vehicle 100 may include a cooling system 106 in fluid communication with electric machine 108 and/or components of electric machine 108.

In some examples, cooling system 106 may be configured to cool electric machine 108. Cooling system 106 may include a pump configured to move a cooling fluid through a cooling circuit including one or more stator portions of electric machine 108. The pump may move the cooling fluid through the stator portion(s) to remove heat from the stator windings via convection. The one or more stator portions may include stator windings. Electric machine 108 may include a rotor and a stator. Electric machine 108 may include stator including a stator core defining a longitudinal axis defining a longitudinal direction (alternatively referred to as an axial direction) and a plurality of stator end windings extending from the stator core along the longitudinal axis. In some examples, adjacent end windings of the plurality of stator end windings define a radial gap, and the radial gap allows a cooling fluid to flow within the radial gap and in contact with the adjacent stator end windings.

Figure 2:
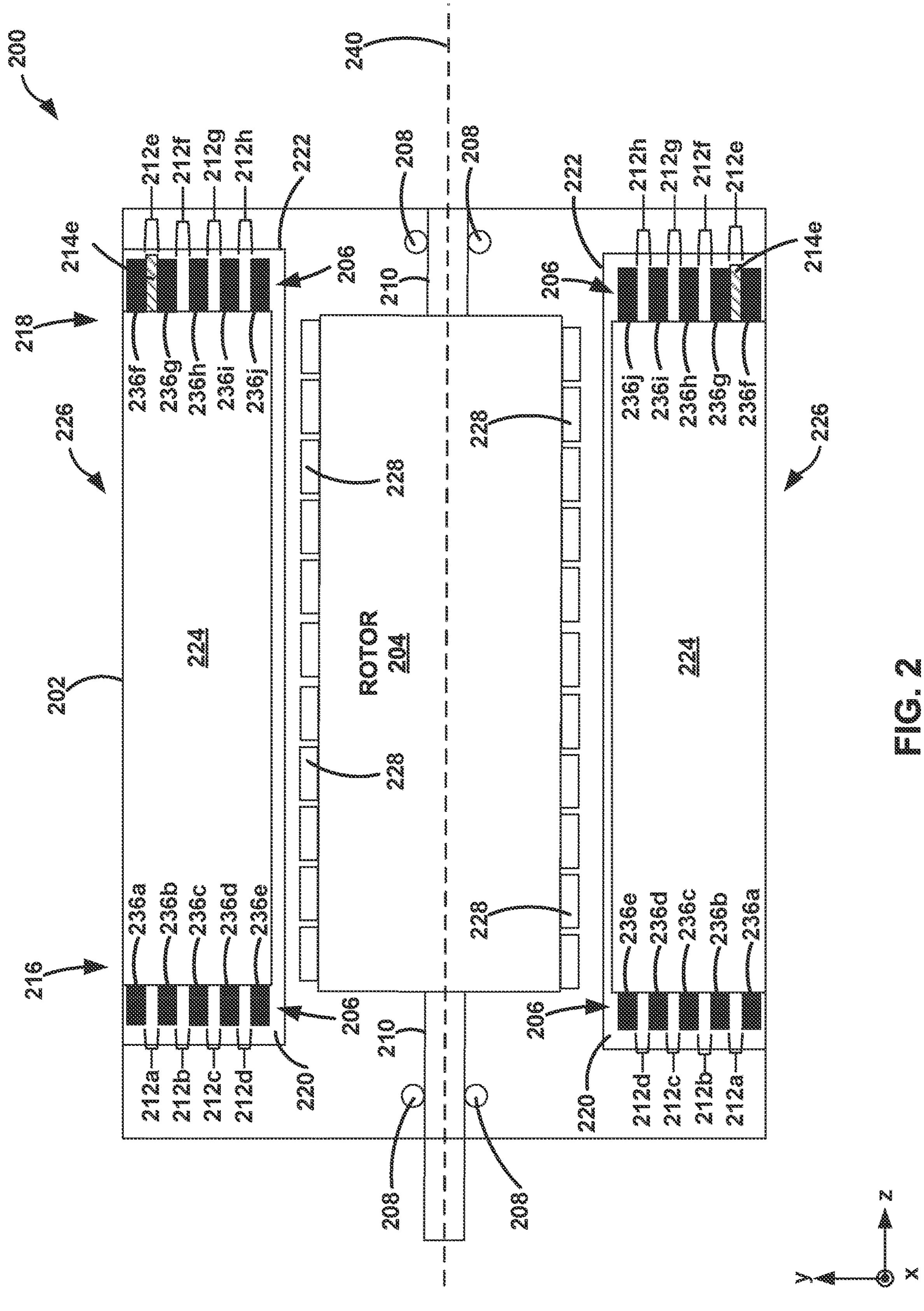
FIG. 2 is a cross-sectional view of an example electric machine, in accordance with one or more techniques of this disclosure.

FIG. 2 is a cross-sectional view of an example electric machine 200, in accordance with one or more techniques of this disclosure. In the example shown, electric machine 200 includes housing 202, rotor 204, stator 226, stator windings 206, and bearings 208.

Bearings 208 may be mechanically connected to rotor 204 via a drive shaft 210. Bearings 208 may be configured to radially and/or axially locate drive shaft 210 and/or rotor 204.

Housing 202 may be configured to provide structure for the components of electric machine 200 and may be made of metal and/or any suitable material. Housing 202 may include fluid inlets and outlets (not shown). Each of the fluid inlets and outlets may be configured to receive and/or output a fluid, e.g., a cooling oil, into and/or from a stator volume 220.

In some examples, the inlets and outlets may be fluidically connected to a pump (not shown) via a fluid path, e.g., via tubes and/or pipes. A fluid may flow through the inlets and fill stator volume 220. For example, stator 226 may be within a stator annulus 222 defining stator volume 220. In some examples, stator annulus 222 may be a stator can, or a stator tube. Stator annulus 222 may be configured to prevent the fluid from contacting rotor 204 and/or a volume of space within which rotor 204 operates. For example, stator annulus 222 may be attached to housing 202 and/or stator 226 within which stator windings 206 are located. Stator annulus 222 may be made of any suitable material, e.g., steel, aluminum, ceramics, composites, plastics, polymeric materials, and the like. In some examples, stator annulus 222 may be configured to be flooded with a fluid and withstand a fluid pressure within stator volume 220, e.g., substantially maintain its shape defining stator volume 220 and contain the fluid. In other examples, electric machine 200 may not include a stator annulus 222.

Stator volume 220 may at least partially include stator windings 206. In the example shown, stator 226 is within stator volume 220 and includes stator core 224. Stator core 224 may be a lamination stack including a plurality of stator teeth. Stator windings 206 are wound about stator teeth of stator core 224. Stator windings 206 may be configured to conduct direct and/or alternating currents and may generate heat, for example, due to ohmic heat caused by the winding resistance. In some examples, stator windings 206 may be concentrated or distributed windings.

In some examples, the fluid flowing in and through stator volumes 220 may be in communication with (e.g., contact with) stator windings 206, and stator windings 206 may transfer at least a portion of its heat to the fluid. The fluid may flow from stator volumes 220 to a heat exchanger (not shown) via a fluid path, e.g., via an outlet from stator volume 220 and tubes and/or pipes fluidically coupled to the outlet.

In the example shown, stator 226 is an external stator, e.g., for use with an internal rotor 204. In other examples, stator 226 may be an internal stator, e.g., for use with an external rotor 204. Stator core 224, or lamination stack, of stator 226 may define a plurality of stator teeth, and the plurality of stator teeth may provide a structure, and define stator slots, for winding the electrical conductors comprising the windings 206 and end stator windings 206, as well as defining longitudinal axis 240, which may be an axis of rotation of rotor 204. Rotor 204 includes a plurality of magnets 228, e.g., permanent magnets 228.

In the example shown, stator 226 includes a plurality of stator end windings **236*a*-236*f* (collectively, stator end windings 236) extending from stator core 224, e.g., extending from the stator slots, along longitudinal axis 240, e.g., in the axial, or z-direction, as shown. For example, stator windings 206 may extend axially within stator core 224 (e.g., within the slots defined by the stator teeth), and stator end windings 236 may be portions of stator windings 206 that extend axially out from stator core 224, e.g., and may wind around the ends of a stator tooth from one stator slot to a different stator slot (or to the same stator tooth slot in some examples). In the example shown, stator end windings 236*a*-236*e* extend from a forward end 216 (e.g., a proximal end) of stator core 224 and the stator slot, and stator end windings 236***f*-236*j* extend from an aft end 218 (e.g., a distal end) of stator core 224 and the stator slot.

In some examples, adjacent stator end windings 236 of the plurality of stator end windings 236 define radial gaps 212*a*-212*h* (collectively, radial gaps 212). In the example shown, stator end windings 236*c* are adjacent to, e.g., next to, stator end windings 236*b* and 236*d* in the radial direction. Stator end windings 236*c* are separated from adjacent stator end windings 236*b* by a radial gap 212*b* in the radially outwards direction (e.g., away longitudinal axis 240) and from adjacent stator end windings 236*d* by a radial gap 212*c* in the radially inwards direction (e.g., towards longitudinal axis 240). Radial gaps 212 may be configured to allow a cooling fluid to flow within the radial gaps and in contact with adjacent end windings, e.g., in contact with adjacent stator end windings 236*b* and 236*c* in a first radial gap 212*b*, and/or in contact with adjacent stator end windings 236*c* and 236*d* in a second radial gap 212*c* at a different radial position from the first radial gap 212*b*. In some examples radial gaps 212 may be controlled during a manufacturing process to ensure the correct gap sizing to improve and/or optimize the cooling flow.

In the example shown, end windings 236 define a plurality of radial gaps at different radial positions, e.g., different radial distances from longitudinal axis 240. For example, radial gap 212*a* is at a different and larger radial distance from longitudinal axis 240 than radial gap 212*b*. In some examples, radial gaps 212 may have the same radial gap size, e.g., the same radial distance or "gap width" in the radial direction. For example, radial gap 212*a* may have the same radial gap size as radial gaps 212*b*-212*h*. In some examples, radial gaps 212 may have a minimum radial gap of 1 millimeter. For example, at least one of radial gaps 212 may have a minimum radial gap distance of 1 millimeter and/or a minimum cross-sectional dimension in the circumferential-radial plane (e.g., the x-y plane as shown) that is greater than or equal to 1 millimeter.

In the example shown, stator end windings 236 may include a plurality of radial layers of end windings, e.g., layers at different radial positions and/or distances from longitudinal axis 240. For example, stator end windings 236*e* may comprise a first radial layer of end windings extending axially (e.g., in the z-directions as shown) from forward end 216 at a first radial position, and stator end windings 236*d* may comprise a second radial layer of end windings extending axially from forward end 216 at a second radial position, and the second radial position may be farther from longitudinal axis 240 than the first radial position. Similarly, stator end windings 236*j* may comprise a first radial layer of end windings extending axially (e.g., in the z-directions as shown) from aft end 218 at a first radial position, and stator end windings 236*i* may comprise a second radial layer of end windings extending axially from aft end 218 at a second radial position, and the second radial position may be farther from longitudinal axis 240 than the first radial position. In the example shown, stator end windings 236*a*-236*e* comprise five radial layers of end windings extending from forward end 216 of stator core 224, and the respective radially adjacent layers of the five radial layers define four radial gaps 212*a*-212*d* at forward end 216 of stator core 224. Additionally, stator end windings 236*f*-236*j* comprise five radial layers of end windings extending from aft end 218 of stator core 224, and the respective radially adjacent layers of the five radial layers define four radial gaps 212*e*-212*h* at aft end 218 of stator core 224.

In some examples, stator end windings 236 define radial gaps 212 having the same radial gap size, e.g., the same radial gap distance and/or gap width. For example, forward radial gap 212*d* (e.g., at forward end 216) may be the same size as forward radial gap 212*c*, e.g., having the same radial gap distance and/or width, but at a different radial position (located a different distance from longitudinal axis 240) and defined by different adjacent layers of windings. Aft radial gap 212*h* (e.g., at aft end 218) may have the same radial gap size as aft radial gap 212*g*, e.g., the same radial gap distance and/or gap width, but at a different radial position (located at a different distance from longitudinal axis 240) and defined by different adjacent layers of windings.

In some examples, one or more of radial gaps 212 may be sized and controlled to optimize the cooling flow direction and cooling flow velocity of a cooling fluid to maximize heat transfer from one or more of end windings 236 to the cooling fluid. For example, one or more of radial gaps 212 may be controlled to have a particular gap size and/or gap distance (e.g., in the radial direction as shown) that is within a particular tolerance. For example, radial gap 212*a* may have a gap distance of about 5 millimeters, e.g., to within plus or minus 50 micrometers, or of about 2 millimeters to within plus or minus 50 micrometers, or of about 1 mm to within plus or minus 50 micrometers, or of about 0.5 mm to within plus or minus 50 micrometers. In other examples, radial gap 212*a* may have a gap size tolerance that is a percentage of the nominal gap size. For example, radial gap 212*a* may have a gap size of about 2 millimeters to within plus or minus 10% (e.g., +/−200 micrometers), or to within plus or minus 5% (e.g., +/−100 micrometers), or to within plus or minus 2.5% (e.g., +/−50 micrometers), or to within any tolerance suitable for controlling radial gaps 212. Controlling and sizing the gaps may involve adjusting the size of the gaps based on measurements when the windings are flexible and before they become rigid. The measurements may involve the use of spacers sized consistent with the desired gap size.

In some examples, one or more of radial gaps 212 may be sized and controlled to optimize the cooling flow to promote symmetrical cooling to end windings 236, e.g., symmetrical in the radial and/or circumferential directions. For example, a plurality of radial gaps 212 may be controlled to the same particular gap size with the same tolerance, e.g., to avoid hot spots.

In some examples, radial gaps 212 may be sized and controlled via locating one or more spacers between two or more end windings 236. In some examples, the spacer may be temporary, e.g., used during and/or after winding, and removed before stiffening end windings 236 such as via application of an insulating resin applied to windings 236.

In the example shown, electric machine 200 includes spacer 214*e*, e.g., within radial gap 212*e*. Spacer 214*e* may be configured to form radial gap 212*e*. For example, during formation of windings 206, a plurality of spacers may be used to maintain gaps between adjacent end windings 236. Although only one spacer 214*e* is shown, electric machine 200 may include a plurality of spacers (collectively, "spacers 214") configured to maintain radial gaps 212 between adjacent end windings 236 to define radial gaps 212, such as during manufacture, formation, and/or use of electric machine 200. During manufacture or formation of electric machine 200, stator 226 may undergo vacuum pressure impregnation (VPI) processing in which a resin is assimilated throughout an insulation system of stator 226 (e.g., coats at least a portion of stator 226 including stator windings 206 and stator end windings 236) with spacers 214 in place, and the resin may stiffen stator windings 206 and/or stator end windings 236. The spacers 214 may then be left in place, or spacers 214 may be removed and adjacent, stiffened stator end windings 236 may maintain radial gaps 212. In examples in which spacers 214 are left in place, spacers 214 may comprise gaps, passageways, voids, recesses, lumens, or the like, in order to enable a fluid to flow through and/or within gaps 212. In the example shown, spacer 214*e* is still in place between adjacent stator end windings 236*f* and 236*g*. In some examples spacer 214*e* may be removed such that radial gap 212*h* is unobstructed and a fluid may flow within and through radial gap 212*h*

Figure 3:
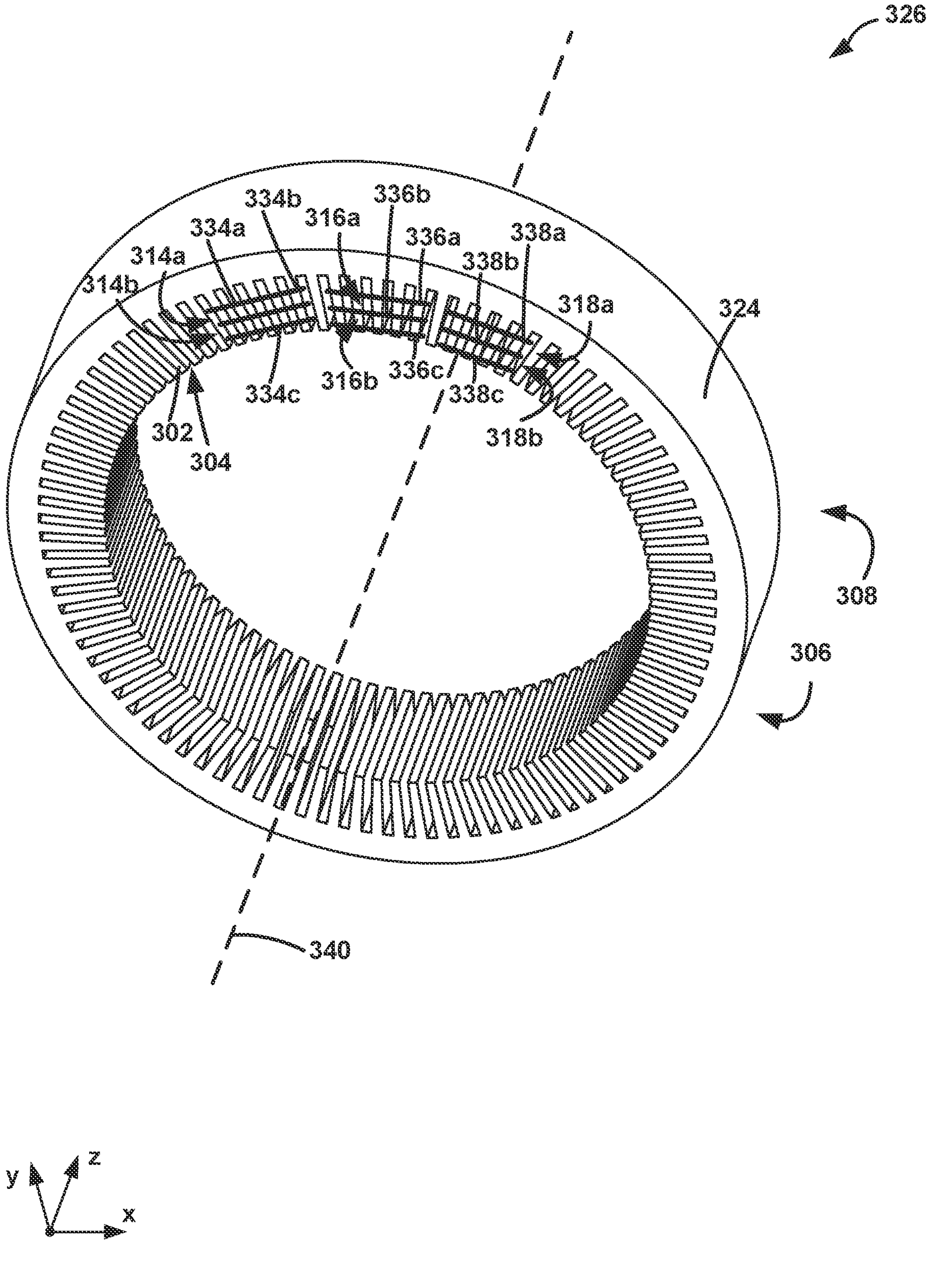
FIG. 3 is a perspective view of an example stator, in accordance with one or more techniques of this disclosure.

FIG. 3 is a perspective view of an example stator 326, in accordance with one or more techniques of this disclosure. In the example shown, stator 326 includes stator core 324 and stator teeth 302. Stator core 324 may define a longitudinal axis 340, which may be an axis of rotation of a rotor (not shown) for use with stator 226. Stator core 324 and stator teeth 302 may define a plurality of stator slots 304. In the example shown, stator 226 is an external stator for use with an internal rotor (not shown) and stator core 324 and stator teeth 302 define a plurality of stator slots 304 about an inner periphery of stator 226. In other examples, stator 226 may be an internal stator for use with an external rotor, and stator core 324 and stator teeth 302 may define a plurality of stator slots 304 about an outer periphery of stator 226. Stator 326 may be an example of stator 226 of FIG. 2, and stator core 324 may be an example of stator core 224 of FIG. 2.

In the example shown, stator 326 includes a plurality of windings comprising end windings 334*a*-334*c* (collectively, "end windings 334), end windings 336*a*-336*c* (collectively, "end windings 336), end windings 338*a*-338*c* (collectively, "end windings 334). Each of end windings 334, 336, and 338 may comprises a plurality of radial layers of end windings and may be a portion of windings that are wound about one or more stator tooth of stator teeth 302, e.g., within stator slots 304. Each of end windings 334, 336, and 338 may be substantially similar to end windings 236 described herein.

In the example shown, end windings 334 define radial gaps 314*a*-314*b* (collectively, "radial gaps 314), end windings 336 define radial gaps 316*a*-316*b* (collectively, "radial gaps 316), and end windings 338 define radial gaps 318*a*-318*b* (collectively, "radial gaps 316). For example, adjacent end windings 334*a*, 334*b* define radial gap 314*a*, adjacent end windings 334*b*, 334*c* define radial gap 314*b*, adjacent end windings 336*a*, 336*b* define radial gap 316*a*, adjacent end windings 336*b*, 336*c* define radial gap 316*b*, adjacent end windings 338*a*, 338*b* define radial gap 318*a*, and adjacent end windings 338*b*, 338*c* define radial gap 318*b*. Radial gaps 314, 316, and 318 may be examples of radial gaps 212 described herein.

In the example shown, end windings 334, 336, and 338 may be end windings of windings wound about several stator teeth (e.g., wound about a plurality of stator teeth 302). In the example shown, end windings 334, 336, and 338 may be end windings of windings that are separately grouped but may be electrically connected, with each group of windings comprising a plurality of radial layers of windings, e.g., three radial layers, which define a plurality of radial gaps, e.g., two radial gaps. In other example, each of end windings 334, 336, and 338 may comprise a wave-winding. For example, end windings 334 and 338 may be on a forward end 306 of stator core 324, and end windings 336 may be end windings on the opposite side of stator core 324, e.g., aft end 308, such that end windings 334*a*, 336*a*, and 348*a* are different end windings of the same radial layer of windings but at different circumferential positions about stator core 324 and/or different longitudinal ends of stator core 324. End windings 334*b*, 336*b*, and 338*b* may be different end windings of a different (second) radial layer of windings at different circumferential positions about stator core 324 and/or different longitudinal ends of stator core 324, and end windings 334*c*, 336*c*, and 338*c* may be different end windings of a different (third) radial layer of windings at different circumferential positions about stator core 324 and/or different longitudinal ends of stator core 324.

Figure 4:
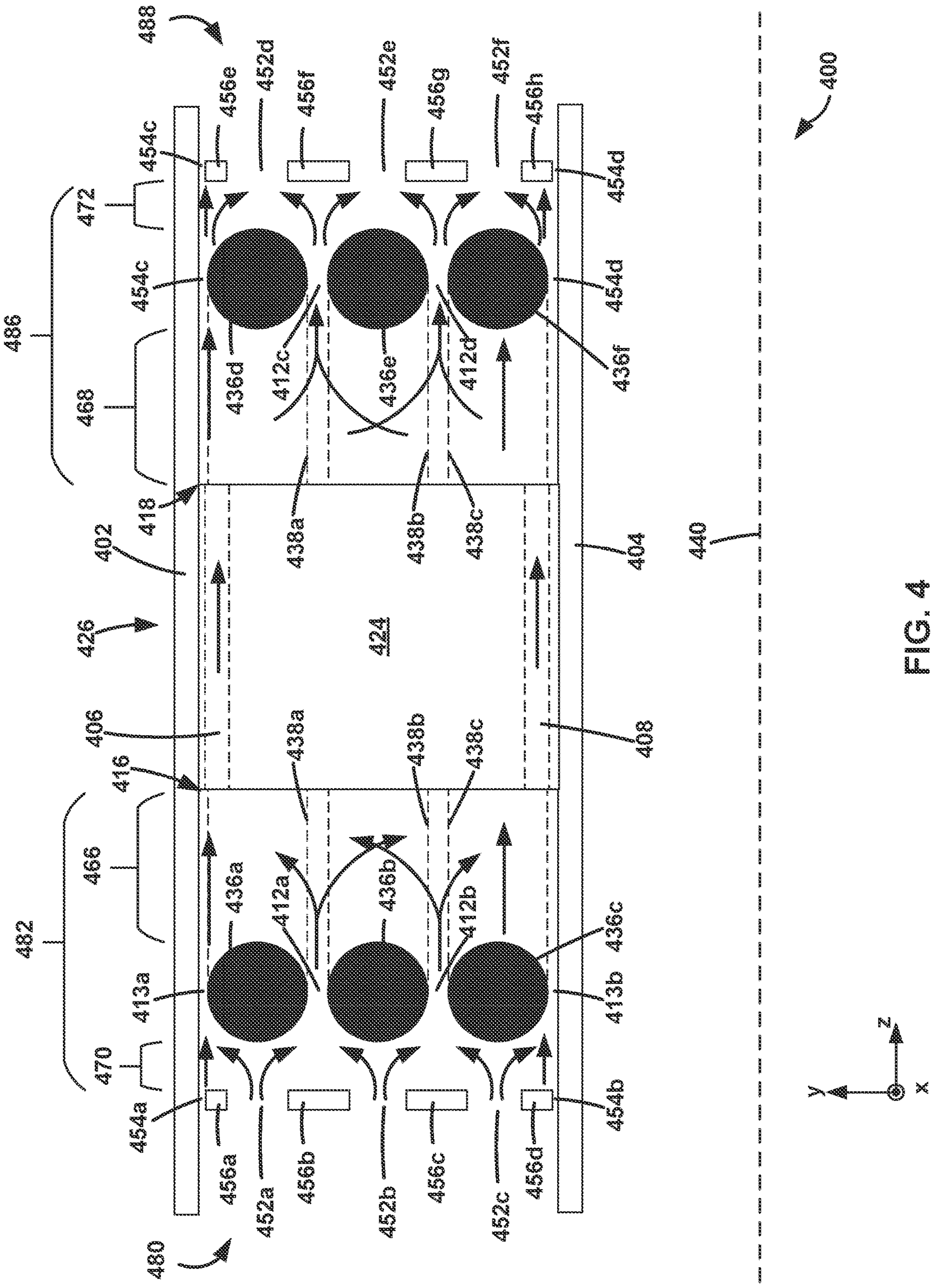
FIG. 4 is a cross-sectional view of a portion of another example electric machine, in accordance with one or more techniques of this disclosure.

FIG. 4 is a cross-sectional view of a portion of an example electric machine 400, in accordance with one or more techniques of this disclosure. Electric machine 400 may be an example of electric machine 200 described herein, and in the example shown, electric machine 400 includes stator 426, outer sleeve 402, inner hub 404, and a plurality of baffles 456*a*-456*h* (collectively, "baffles 456"). Outer sleeve 402 and inner hub 404 may be examples of housing 202 and/or stator tube 222 described herein. Stator 426 may be an example of stators 326 and 226 described herein. Stator 426 may define longitudinal axis 440, which may be an axis of rotation of a rotor (not shown) for use with stator 426. Stator 426 may be substantially symmetric about longitudinal axis 440, and FIG. 4 illustrates only a portion of a cross-section of electric machine 400 illustrating stator 426, e.g., at a circumferential position (and without a rotor).

In the example shown, stator 426 includes stator core 424, and stator core 424 may be an example of stator cores 324 and 224 described herein. Stator 426 also includes a plurality of radial winding layers 438*a*-438*c* (collectively, "radial winding layers 438). Radial winding layers 438 include stator end windings 436*a*-436*f* (collectively, stator end windings 436"). In the example shown, stator end windings 436 comprise a plurality of radial layers of end windings. For example, stator end windings 436*a* and 436*d* may be forward and aft end windings of a first radial winding layer 438*a* that extend from forward end 416 and aft end 418, respectively, of stator core 424. Stator end windings 436*b* and 436*e* may be forward and aft end windings of a second radial winding layer 438*b* that extend from forward end 416 and aft end 418, respectively, of stator core 424, and stator end windings 436*c* and 436*f* may be forward and aft end windings of a third radial winding layer 438*c* that extend from forward end 416 and aft end 418, respectively, of stator core 424. In some examples, radial winding layers 438 and stator end windings 436 may be wound and/or arranged with symmetrical patterns and layers configured to allow for uniform radial gaps 412, which are configured to enable uniform flow of a fluid, e.g., uniform cooling fluid flow.

In the example shown, stator 426 includes a plurality of radial gaps 412*a*-412*d* (collectively, "radial gaps 412"). Adjacent stator end windings 436 define respective radial gaps 412. For example, stator end windings 436*a* are adjacent to stator end windings 436*b*, both of which define radial gap 412*a*. Stator end windings 436*b* are adjacent to stator end windings 436*c*, both of which define radial gap 412*b*, stator end windings 436*d* are adjacent to stator end windings 436*e*, both of which define radial gap 412*c*, and stator end windings 436*e* are adjacent to stator end windings 436*f*, both of which define radial gap 412*d*. Stator end windings 436 may be examples of end windings 236, 334, 336, 338 described herein, and radial winding layers 438 may be examples of stator windings 206 of FIG. 2 and the plurality of windings described with reference to FIG. 3 and/or elsewhere herein.

In the example shown, electric machine 400 is configured to cause a fluid to flow within and/or about stator 426 in the direction indicated by the arrows, e.g., from forward end 416 to aft end 418. In other examples, electrical machine 400 may be configured to cause the fluid to move in the other longitudinal direction, or in either longitudinal direction. In the example shown, stator core 424 includes fluid passageways 406 and 408. Fluid passageway 406 is located at a first radial position and fluid passageway 408 is located at a second radial position that is different from the first radial position, namely, at a radial distance from longitudinal axis 440 that is less than a radial distance of the first radial position from longitudinal axis 440. Fluid passageways 406, 408 extend longitudinally through stator core 424 between forward end 416 and aft end 418 of stator core 424. Fluid passageways 406, 408 may be configured to allow a fluid to flow between forward end 416 and aft end 418 of stator core 424. For example, fluid passageways 406, 408 may be in fluid communication with volumes at the forward end 416 and aft end 418 of stator core 424. Although stator core 424 includes two fluid passageways, in other examples, stator core 424 may include fewer or more fluid passageways, e.g., one fluid passageway or three or more fluid passageways. In some examples, any or all of the plurality of fluid passageways, e.g., fluid passageways 406, 408 in the example shown, may have a minimum cross-sectional dimension of 500 micrometers. For example, fluid passageways 406, 408 may have a minimum cross-sectional dimension in the circumferential-radial plane (e.g., the x-y plane as shown) that is greater than or equal to 500 micrometers.

In the example shown, electric machine 400 includes a forward baffles **456*a*-456*d* and aft baffles 456*e*-456*h* (collectively, "baffles 456"). In some examples, forward baffles 456*a*-456*d* may each be a part of a single forward structure, e.g., defining a plurality of disks with slots and/or baffle apertures between the disks, and aft baffles 456*e*-456*h* may each be a part of a single aft structure, e.g., defining a plurality of disks with slots and/or baffle apertures between the disks. In other examples, each of baffles 456** may be separate from each other.

In some examples, forward baffles **456*a*-456*d* (e.g., near forward end 416) may be a plurality of radial disks defining baffle apertures 452*a*-452*c* (collectively, along with baffle apertures 452*d*-452*f*, "baffle apertures 452"), which may comprise circumferential slots at different radial positions between the slots. Baffles 456*a* and sleeve 402 may define baffle aperture 454*a*, and baffle 456*d* and inner hub 404 may define baffle aperture 454*b*. Similarly, aft baffles 456*e*-456*h* (e.g., near aft end 418) may be a plurality of radial disks defining baffle apertures 452*d*-452*f*, which may comprise circumferential slots at different radial positions between the slots. Baffles 456*e* and sleeve 402 may define baffle aperture 454*c*, and baffle 456*h* and inner hub 404 may define baffle aperture 454*d*. In some examples, baffle apertures 454*a*-454*d* (collectively, baffle apertures 454") may be the same size as baffle apertures 452 and in other examples, baffle apertures 454 may be different sizes than baffle apertures 452**.

In some examples, baffles 456 may be configured to separate a first volume of stator 426 including stator end windings 436 from a second volume of stator 426 that extends longitudinally away from stator end windings 436, e.g., and does not include stator end windings 436. For example, stator 226 may include a first volume 480 extending longitudinally away from baffles **456*a*-456*d* and stator end windings 436 (e.g., in the negative z-direction as shown) and radially within sleeve 402 and inner hub 404, a second volume 482 that extends longitudinally from baffles 456*a*-456*d* to the forward end 416 of stator core 424 and radially within sleeve 402 and inner hub 404 (and includes stator end windings 436*a*-436*c*), a third volume 486 that extends longitudinally from the aft end 418 of stator core 424 to baffles 456*e*-456*h* and radially within sleeve 402 and inner hub 404 (and includes stator end windings 436*d*-436*f*), and a fourth volume 488 extending longitudinally away from baffles 456*e*-456*f* and stator end windings 436 (e.g., in the positive z-direction as shown) and radially within sleeve 402 and inner hub 404**.

Baffles **456*a*-456*d* may be configured to separate volumes 480 and 482, and baffles 456*e*-456*f* may be configured to separate volumes 486 and 488. For example, baffles 456*a*-456*d* may be configured to prevent fluid within volume 480 and 482 to intermix so as to come to an equilibrium temperature, and baffles 456*e*-456*f* may be configured to prevent fluid within volume 486 and 488 to intermix so as to come to an equilibrium temperature. In some examples, baffles 456 may be configured to prevent the fluid from contacting stator end windings 436 and heating before traversing the circumference of stator 226. For example, baffles 456*a*-456*d* may be configured to allow a fluid to flow into volume 480 (e.g., from a stator housing inlet, not shown) and flow circumferentially within volume 480 without being heated by end windings 436, e.g., to cause at least a portion of fluid incoming into volume 480 to flow circumferentially and separately from stator end windings 436 to as to maintain a substantially uniform temperature of the fluid as a function of circumferential position within volume 480. Baffle apertures 452 are configured to allow the substantially uniform temperature fluid (e.g., circumferentially) within volume 480 to flow to volume 482 substantially uniformly as a function of circumferential position, and thereby reduce or prevent circumferential hot spots on stator end windings 436** due to circumferentially uneven temperature cooling fluid.

In some examples, baffles 456 may define baffle apertures 452 (and 454) that may be configured to allow the fluid to flow between volumes, e.g., at least in one direction. In the example shown, baffle apertures **452*a*-452*c* and 454*a*-454*b* may be configured to allow a fluid to flow from volume 480 to volume 482, fluid passageways 406 and 408 may be configured to allow the fluid to flow from volume 482 to volume 486, and baffle apertures 452*d*-452*f* and 454*c*-454*d* may be configured to allow a fluid to flow from volume 486 to volume 488. In some examples, baffles 456 are configured to cause a fluid to intermix within a volume and to have substantially the same temperature, e.g., a substantially uniform temperature distribution, within volumes 482 and 486**.

Baffles 456 may be configured to cause the fluid to have substantially the same temperature as a function of circumferential position within volumes 482 and 486, e.g., at a plurality of circumferential positions to minimize variation of the cooling circumferentially. For example, baffles 456 may define baffle apertures 452 and 454 that extend circumferentially about longitudinal axis 240 and are configured to allow the fluid to flow from volume 480 to volume 482 (and from volume 486 to volume 488) substantially uniformly in the circumferential direction. In some examples, each baffle aperture of the plurality of baffle apertures 452 may have an area (e.g., a cross-section area or clear baffle aperture area) configured such that a temperature of the fluid flowing across a radial layer of end windings 436 within a volume (e.g., volume 482 or volume 486) at a first circumferential position is substantially the same as the temperature of the fluid flowing across the radial layer of end windings 436 within the first volume at a second circumferential position different from the first circumferential position. For example, baffles 456, baffle apertures 452, and/or baffle apertures 454 are configured to have cross-sectional areas allowing a fluid to flow from volume 480 to volume 482, and from volume 486 to volume 488, such that the temperature of the fluid within volume 482 is substantially uniform both radially and circumferentially, and/or the temperature of the fluid within volume 486 is substantially uniform both radially and circumferentially. In this way, baffles 456 may be configured to improve the circumferential and radial uniformity of cooling of end windings 436 by a cooling fluid such that a first radial layer corresponding to stator end windings 436*a*, 436*d*, a second radial layer corresponding to stator end windings 436*b*, 436*e*, and a third radial layer corresponding to stator end windings 436*c*, 436*f* are contacted by fluid having substantially the same temperature, having substantially the same flow and flow rate of fluid contacting the surface of the respective stator end windings 436 radial layers, and having a substantially uniform cooling rate of the respective stator end windings 436 radial layers.

In some examples, baffles 456 may be longitudinally positioned and radially configured to allow a fluid to flow from volume 480 to volume 482, and from volume 486 to volume 488, such that the temperature of the fluid within volume 482 is substantially uniform both radially and circumferentially, and/or the temperature of the fluid within volume 482 is substantially uniform both radially and circumferentially. For example, baffles 456*a*-456*d* may be longitudinally separated from a surface of stator end windings 436*a*-436*c* by distance 470, for example about 500 micrometers, or about 1 millimeter, or about 2 millimeters, or about 5 millimeters, or about any distance less than or equal to 10 millimeters, and baffles 456*e*-456*h* may be longitudinally separated from a surface of stator end windings 436*d*-436*f* by distance 472, for example about 500 micrometers, or about 1 millimeter, or about 2 millimeters, or about 5 millimeters, or about any distance less than or equal to 10 millimeters, In the example shown, baffles 456 are configured to define baffle apertures 452 that are radially aligned with stator end windings 436. For example, baffles 456*a*-456*d* define baffle apertures 452*a*-452*c* that are radially aligned with each of the radial layers of stator end windings 436*a*-436*c*, respectively, and baffles 456*e*-456*f* define baffle apertures 452*d*-452*f* that are radially aligned with each of the radial layers of stator end windings 436*d*-436*f*. In some examples, baffles 456 may be configured to define radial baffle apertures 452 having radial centers (e.g., radial midpoints) that are radially aligned with the radial centers of the end windings of the respective radial layers of windings, e.g., aligned with the radial centers of respective stator end windings 436. For example, baffles 456*a*, 456*b* may define baffle aperture 452*a* having a radial center or midpoint that is radially aligned with (e.g., at the same radial position or distance from longitudinal axis 440 as) a radial center of stator end winding 436*a*. In the example shown, one or more of baffles 456 may be radially aligned with one or more of respective radial gaps 412. For example, baffle 456*b* may be radially aligned with radial gap 412*a*, and in some examples, a radial center or midpoint of baffle 456*b* may be radially aligned with a radial center and/or midpoint of radial gap 412*a*.

In some examples, baffles 456 are configured to improve and/or increase heat transfer from stator end windings 436 to the fluid. For example, baffles 456 may define baffle apertures 452 having areas that increase the fluid velocity of the fluid through the baffle apertures 452, and baffles 456 may be longitudinally positioned a distance 470 from radial stator end windings 436 and radially configured to align baffle apertures 452 with a longitudinally-most outward (from stator core 424) surface of stator end windings 436 so as to increase the fluid velocity of the fluid impinging on surfaces of stator end windings 436.

In some examples, any or all of radial gaps 412, baffles 456, and/or fluid passageways 406, 408 are configured to improve and/or increase cooling of stator end windings 436 (with a relatively smaller fluid pressure drop, in some examples) by increasing the surface area of contact between the fluid and stator end windings 436 and/or reducing quiescent flow of the fluid. For example, the stator end windings 436 may extend longitudinally out from stator core 424, e.g., by a distance 466 and/or 468. Radial gaps 412 may be configured to allow a fluid to flow within volumes 482 and 486 and contact surfaces of stator end windings 436 and stator core 424 that are between stator end windings 436 and stator core 424, thereby increasing the flow of the fluid along those surfaces that the fluid may otherwise not contact and/or may be relatively quiescent, still, stagnant, have little to no flow, or the like.

Figure 5:
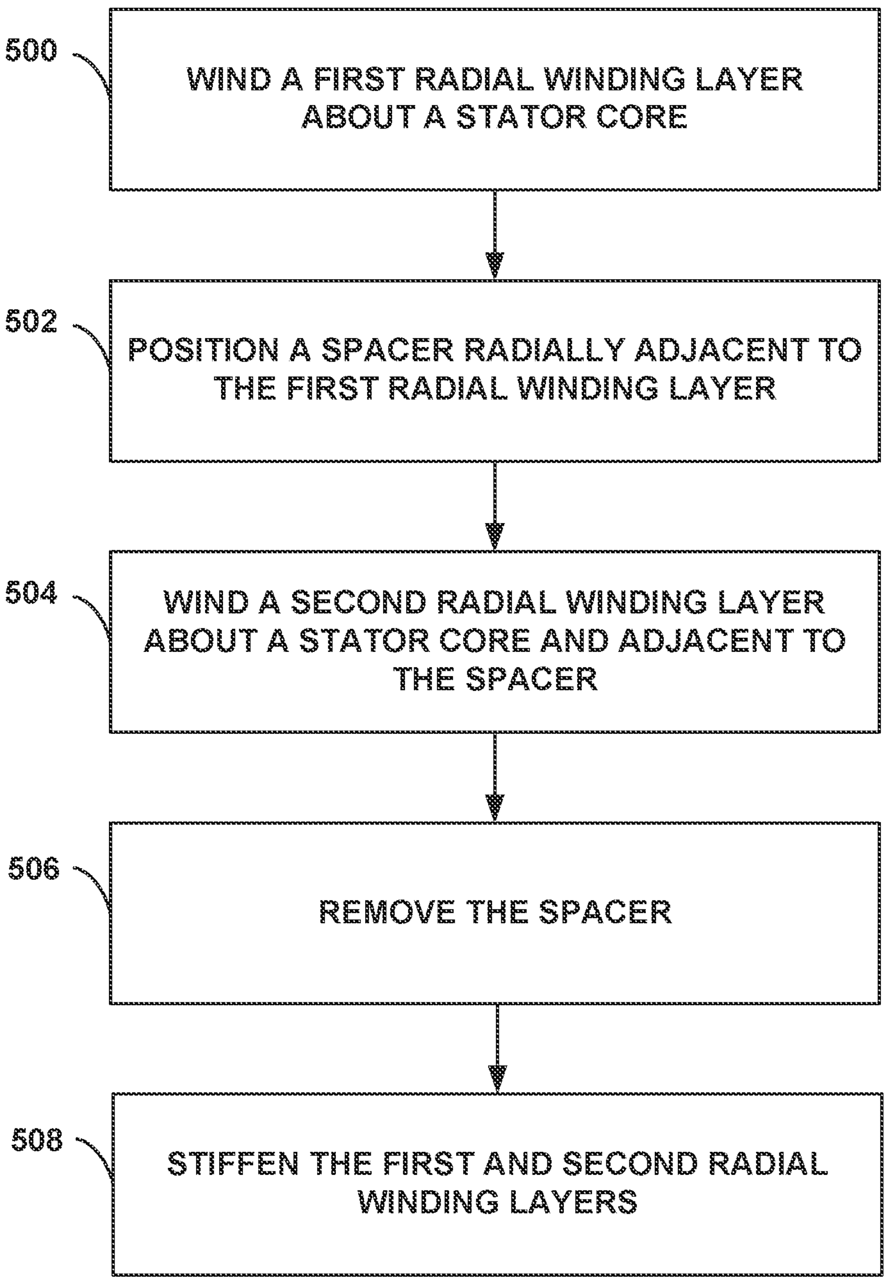
FIG. 5 is a is a flowchart illustrating an example method of making an electric machine, in accordance with one or more techniques of this disclosure.
Figure 6:
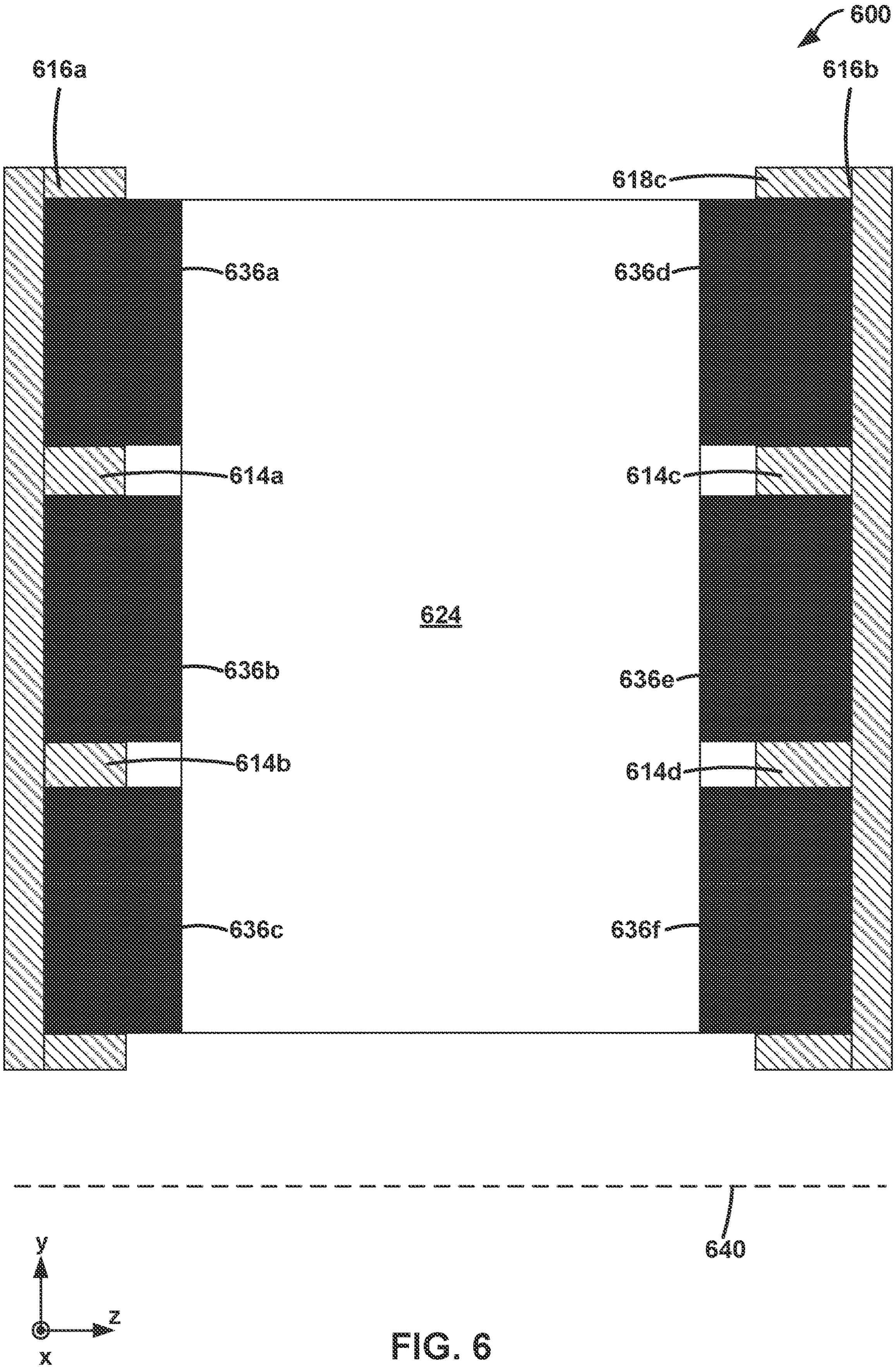
FIG. 6 is a cross-sectional view of a portion of another example electric machine, in accordance with one or more techniques of this disclosure.

FIG. 5 is a is a flowchart illustrating an example method of making an electric machine, in accordance with one or more techniques of this disclosure. FIG. 6 is a cross-sectional view of a portion of another example electric machine 600, in accordance with one or more techniques of this disclosure, and is described concurrently with the method of FIG. 5. The method of FIG. 5 is described with reference electric machines 108, 200, 400, and 600 and stator 326, however, the method of FIG. 5 may be practiced to make any electric machine and/or stator according to the present disclosure.

A manufacturer may wind a first radial layer of electrically conductive windings about a stator core (500). For example, the manufacturer may wind a radial winding layer comprising radial stator end windings 636*a*, 636*d* about a stator core 624 that defines a longitudinal axis 640 (FIG. 6). Each of radial stator end windings 636*a*, 636*d* may extend from stator core 424 in the longitudinal direction at a first radial distance (or at a first radial position) from longitudinal axis 640. In the example shown in FIG. 6, electric machine 600 includes stator core 624 and a plurality of stator end windings 636*a*-636*f* (collectively, "stator end windings 636"). Electric machine 600 may be an example of electric machine 400, 200, and/or 108, stator 624 may be an example of stator 424, 324, and/or 224, and stator end windings 636 may be an example of stator end windings 436, 334, 336, 338, and/or 236 described herein. In some examples, stator end windings 636, and the radial layers of windings including stator end windings 636, may comprise a plurality of Litz wires. In some examples, any of stator end windings 436, 334, 336, 338, and/or 236 described here may comprise Litz wires.

A manufacturer may position a spacer such that a first surface of the spacer is adjacent to the first radial end winding layer, and the spacer is positioned a second radial distance from the longitudinal axis (502). For example, the manufacturer may position spacer 614*a* with an outer radial surface of spacer 614*a* adjacent to, and/or in contact with, stator end winding 636*a* (FIG. 6). In some examples, the manufacturer may also position spacer 614*c* with an outer radial surface of spacer 614*c* adjacent to, and in contact with, stator end winding 636*d*. The manufacturer may position spacers 614*a*, 614*c* a second radial distance (or at a second radial position) from longitudinal axis 640. In the example shown in FIG. 6, electric machine 600 includes spacers 614*a*-614*d* (collectively, "spacers 614). Spacers 614 may be examples of spacers 214 described herein. In the example shown in FIG. 6, spacers 614*a* and 616*b* may be connected to frame 616*a*, and spacers 614*c* and 614*d* may be connected to a frame 616*b*. Frames 616*a* and 616*b* may be configured to define and/or maintain a radial spacer separation of spacers 614 and may be configured to place and remove spacers 616 from between stator end windings 636. In some examples, the manufacturer may position spacer 614*a* before winding the first layer of electrically conductive windings (e.g., before method step 500), or after winding a second radial layer of electrically conductive windings (e.g., after method step 504 described below).

A manufacturer may wind a second radial layer of electrically conductive windings about the stator core (504). For example, the manufacturer may wind a radial winding layer comprising radial end windings 636*b*, 636*e* about a stator core 624 (FIG. 6). Each of radial end windings 636*b*, 636*e* may extend from stator core 424 in the longitudinal direction at a third radial distance (or at a third radial position) from longitudinal axis 640. Each of radial end windings 636*b*, 636*e* may be adjacent to, and/or in contact with, an inner radial surface of spacers 614*a*, 614*c*, respectively, e.g., surfaces of spacers 614*a*, 614*c* that are opposite to their respective outer radial surfaces. In some examples, spacers 614 define radial gaps between different radial layers of stator end windings 636. In some examples, spacers 614 (and spacers 214) may define radial gaps 212, 314, 316, 318, and/or 412 described herein.

In some examples, the manufacturer may remove spacers 614 (506), and the manufacturer may stiffen the first radial end winding layer, e.g., stator end windings 636*a*, 636*d*, and the second radial end winding layer, e.g., stator end windings 636*b*, 636*e*, such that the first and second radial end winding layers maintain their respective radial gaps without spacers 614. In some examples, stiffening the radial end winding layers, e.g., any of stator end windings 636*a*, 636*d*, stator end windings 636*b*, 636*e*, and/or stator end windings 636*c*, 636*f*, may comprise vacuum pressure impregnation of a resin, e.g., within and/or about stator end windings 636.

In other examples the spacers between the end windings may be added after the windings have been fully wound around the stator core but before the stator is impregnated with electrically insulating varnish. Since the varnish may stiffens the end windings into a rigid position during curing of the resin. The spacers may be made of teflon or similar no-stick material such that the varnish will not adhere to the spacers to allow the spacers to be removed from the windings after the varnish is cured and the windings have stiffened to permanently form the end winding gaps of the desired size.

In some examples, stator core 624 and stator end windings 636 may be disposed within a stator housing. In some examples, the method may further include separating a first volume of a stator (e.g., a stator including stator core 624 and stator end windings 636) defined by stator housing and including the first and second radial end winding layers (e.g., stator end windings 636) from a second volume defined by the stator housing and not including the first and second radial end winding layers and extending longitudinally away from the first and second radial end winding layers and the stator core. For example, with reference to FIG. 4, the manufacturer may position, affix, attach, or otherwise dispose baffles 456 within sleeve 402 and inner hub 404 to separate volume 480 from volume 482, or to separate volume 486 from volume 488. In some examples, the method may further include radially aligning each baffle aperture 452 defined by baffles 456 with each of the radial layers of stator end windings 436.

The following examples may illustrate one or more aspects of the disclosure:

Example 1: An electric machine including: a rotor; and a stator including: a stator core defining a longitudinal axis; and a plurality of stator end windings extending from the stator core along the longitudinal axis, wherein adjacent end windings of the plurality of stator end windings define a radial gap, wherein the radial gap is configured to allow a cooling fluid to flow within the radial gap and in contact with the adjacent stator end windings.

Example 2: The electric machine of example 1, wherein the radial gap is a first radial gap, wherein the adjacent end windings of the plurality of stator end windings define a second radial gap at a radial distance from the longitudinal axis that is different from a radial distance from the longitudinal axis of the first radial gap.

Example 3: The electric machine of example 2, wherein a radial gap distance of the first radial gap is the same as a radial gap distance of the second radial gap.

Example 4: The electric machine of any one of examples 1 through 3, wherein the plurality of stator end windings comprise a plurality of forward end windings extending from a forward end of the stator core and a plurality of aft end windings extending from a aft end of the stator core, wherein the adjacent end windings defining the radial gap comprise forward adjacent end windings defining a forward radial gap and aft adjacent end windings defining a aft radial gap.

Example 5: The electric machine of example 4, wherein the forward radial gap is a first forward radial gap, wherein the aft radial gap is a first aft radial gap, wherein the forward adjacent end windings comprises a plurality of radial layers of forward end windings, wherein the plurality of radial layers of forward end windings define the first forward radial gap and a second forward radial gap; wherein the aft adjacent end windings comprises a plurality of radial layers of aft end windings, wherein the plurality of radial layers of aft end windings define the first aft radial gap and a second aft radial gap.

Example 6: The electric machine of example 5, wherein a radial gap distance of the first forward radial gap is the same as a radial gap distance of the second forward radial gap, wherein a radial gap distance of the first aft radial gap is the same as a radial gap distance of the second aft radial gap.

Example 7: The electric machine of any one of examples 1 through 6, wherein the stator core comprises a plurality of fluid passageways at a plurality of radial distances from the longitudinal axis, wherein each fluid passageway of the plurality of fluid passageways extends longitudinally through the stator core between a forward end of the stator core and an aft end of the stator core and is configured to allow the cooling fluid to flow between the forward end of the stator core and the aft end of the stator core.

Example 8: The electric machine of example 7, wherein each of the plurality of passageways, the first and second forward radial gaps, and the first and second aft radial gaps have a minimum cross-sectional dimension in a circumferential-radial plane that is greater than or equal to 500 micrometers.

Example 9: The electric machine of any one of examples 1 through 8, wherein the stator further comprises a baffle configured to separate a first volume of the stator including the plurality of stator end windings from a second volume of the stator extending longitudinally away from the baffle and the plurality of stator end windings and the stator core, wherein the baffle comprises a plurality of baffle apertures configured to allow the cooling fluid to flow between the first volume and the second volume.

Example 10: The electric machine of example 9, wherein the baffle is configured to cause the cooling fluid at a first circumferential position within the second volume to have substantially the same temperature as the cooling fluid at a second circumferential position within the second volume.

Example 11: The electric machine of example 9 or example 10, wherein the plurality stator end windings comprises a plurality of radial layers of end windings, wherein the radial gap comprises a plurality of radial gaps defined by adjacent radial layers of the plurality of radial layers of end windings, wherein each baffle aperture of the plurality of baffle apertures is radially aligned with each radial layer of end windings.

Example 12: The electric machine of any one of examples 9 through 11, wherein each baffle aperture of the plurality of baffle apertures comprises an baffle aperture area configured such that a temperature of the cooling fluid flowing across a radial layer of end windings within first volume at a first circumferential position is substantially the same as the temperature of the cooling fluid flowing across the radial layer of end windings within the first volume at a second circumferential position different from the first circumferential position.

Example 13: The electric machine of any one of examples 1 through 12, wherein the plurality of end windings comprises one or more electrically insulated bundles of stranded wires.

Example 14: The electric machine of example 13, wherein the plurality of end windings comprises Litz wires.

Example 15: The electric machine of any one of examples 1 through 14, wherein the radial gap is sized and controlled to optimize the cooling flow direction and cooling flow velocity to maximize heat transfer from the end windings to the cooling fluid.

Example 16: The electric machine of any one of examples 1 through 15, wherein the radial gap is sized and controlled to optimize the cooling flow to promote symmetrical cooling to the end windings both radially and circumferentially.

Example 17: The electric machine of any one of examples 1 through 16, wherein the radial gap is ensured by locating a temporary spacer between the windings during the winding process.

Example 18: The electric machine of any one of examples 1 through 17, wherein the radial gap is ensured by locating a temporary spacer between the adjacent windings before an insulating resin is applied to the windings.

Example 19: The electric machine of any one of examples 2 through 18, wherein the first and second radial gaps are sized and controlled to promote cooling flow to provide optimized and symmetrical cooling to the different windings and avoid hot spots.

Example 20: A method of making an electric machine, the method including: winding a plurality of layers of electrically conductive windings about a stator core, the stator core defining a longitudinal axis, wherein each layer of the plurality of layers of electrically conductive windings comprises an end winding layer extending from the stator core in the longitudinal direction; and positioning a spacer between adjacent end winding layers of the plurality of end winding layers, wherein a spacer defines a radial gap distance between the adjacent end winding layers.

Example 21: The method of example 20, wherein the spacer is a temporary spacer, the method further including: removing the spacer; and stiffening the end winding layers of the plurality of layers of electrically conductive windings such that the adjacent end winding layers maintain the radial gap without the spacer.

Example 22: The method of example 21, wherein removing the spacer occurs after stiffening the of the end winding layers.

Example 23: The method of example 21 or example 22, wherein stiffening the end winding layers comprises vacuum pressure impregnation of a resin in the end winding layers.

Example 24: The method of any one of examples 20 through 23, wherein the stator core and the end winding layers are within a stator housing, the method further comprising: separating, by positioning one or more baffles between a first volume and second volume, the first volume of a stator defined by the stator housing and including the end winding layers from the second volume defined by the stator housing and not including the end winding layers and extending longitudinally away from the end winding layers and the stator core, wherein the baffle comprises a plurality of baffle apertures configured to allow a cooling fluid to flow between the first volume and the second volume.

Example 25: The method of example 24, further including radially aligning each baffle aperture of the plurality of baffle apertures with each radial end winding layers of the plurality of radial end winding layers.

Example 26: A stator including: a stator core defining a longitudinal axis; and a plurality of radial layers of stator end windings extending from the stator core in the longitudinal direction, wherein adjacent radial layers of the plurality of radial layers of stator end windings define a plurality of radial gaps, wherein the radial gap is configured to allow a cooling fluid to flow within the radial gap and in contact with the adjacent stator end windings.

Example 27: The stator of example 26, wherein each gap of the plurality of radial gaps comprise substantially the same distance in the radial direction, the stator further including: a baffle configured to separate a first volume of the stator including the plurality of radial layers of stator end windings from a second volume of the stator extending longitudinally away from the plurality of stator end windings and the stator core, wherein the second volume does not include the plurality of radial layers of stator end windings, wherein the baffle comprises a plurality of baffle apertures configured to allow the cooling fluid to flow between the first volume and the second volume, wherein each baffle aperture of the plurality of baffle apertures is radially aligned with each radial layer of end windings wherein the stator core comprises a plurality of fluid passageways at a plurality of radial distances from the longitudinal axis, wherein each fluid passageway of the plurality of fluid passageways extends longitudinally through the stator core between a forward end of the stator core and a aft end of the stator core and is configured to allow the cooling fluid to flow between the forward end of the stator core and the aft end of the stator core, wherein the second volume comprises a fluid inlet configured to allow the cooling fluid to flow into the second volume.

Various examples have been described. These and other examples are within the scope of the following claims.

What is claimed is:

1. An electric machine comprising:

a rotor; and a stator comprising:

a stator core defining a longitudinal axis;

a plurality of stator end windings extending from the stator core along the longitudinal axis; and a baffle configured to separate a first volume of the stator including the plurality of stator end windings from a second volume of the stator extending longitudinally away from the baffle and the plurality of stator end windings and the stator core, and wherein:

the baffle comprises a plurality of baffle apertures configured to allow a cooling fluid to flow between the first volume and the second volume, adjacent end windings of the plurality of stator end windings define a radial gap, the plurality of stator end windings comprises a plurality of radial layers of end windings, each baffle aperture of the plurality of baffle apertures is radially aligned with each radial layer of end windings, the radial gap comprises a plurality of radial gaps defined by adjacent radial layers of the plurality of radial layers of end windings, and the radial gap is configured to allow the cooling fluid to flow within the radial gap and in contact with the adjacent stator end windings.

2. The electric machine of claim 1, wherein the radial gap is a first radial gap, wherein the adjacent end windings of the plurality of stator end windings define a second radial gap at a radial distance from the longitudinal axis that is different from a radial distance from the longitudinal axis of the first radial gap.

3. The electric machine of claim 2, wherein a radial gap distance of the first radial gap is the same as a radial gap distance of the second radial gap.

4. The electric machine of claim 1, wherein the plurality of stator end windings comprise a plurality of forward end windings extending from a forward end of the stator core and a plurality of aft end windings extending from an aft end of the stator core, wherein the adjacent end windings defining a plurality of radial gaps comprise forward adjacent end windings defining a plurality of forward radial gaps and aft adjacent end windings defining a plurality of aft radial gaps.

5. The electric machine of claim 1, wherein the stator core comprises a plurality of fluid passageways at a plurality of radial distances from the longitudinal axis, wherein each fluid passageway of the plurality of fluid passageways extends longitudinally through the stator core between a forward end of the stator core and an aft end of the stator core and is configured to allow the cooling fluid to flow between the forward end of the stator core and the aft end of the stator core.

6. The electric machine of claim 1, wherein the baffle is configured to cause the cooling fluid at a first circumferential position within the second volume to have substantially the same temperature as the cooling fluid at a second circumferential position within the second volume.

7. The electric machine of claim 1, wherein each baffle aperture of the plurality of baffle apertures comprises an baffle aperture area configured such that a temperature of the cooling fluid flowing across a radial layer of end windings within first volume at a first circumferential position is substantially the same as the temperature of the cooling fluid flowing across the radial layer of end windings within the first volume at a second circumferential position different from the first circumferential position.

8. The electric machine of claim 1, wherein the plurality of end windings comprises one or more electrically insulated bundles of stranded wires.

9. The electric machine of claim 8, wherein the plurality of end windings comprises Litz wires.

10. The electric machine of claim 1, wherein the radial gap is sized and controlled to optimize the cooling flow velocity to maximize heat transfer from the end windings to the cooling fluid.

11. The electric machine of claim 1, wherein the radial gap is sized and controlled to optimize the cooling flow direction and velocity to promote symmetrical cooling to the end windings both radially and circumferentially.

12. A method of making an electric machine, the method comprising:

winding a plurality of layers of electrically conductive stator windings about a stator core, the stator core defining a longitudinal axis, wherein the stator comprises:

a plurality of stator end windings extending from the stator core along the longitudinal axis, wherein the plurality of stator end windings comprises a plurality of radial layers of end windings;

a baffle configured to separate a first volume of the stator including the plurality of stator end windings from a second volume of the stator extending longitudinally away from the baffle and the plurality of stator end windings and the stator core, and wherein:

the baffle comprises a plurality of baffle apertures configured to allow a cooling fluid to flow between the first volume and the second volume; and each baffle aperture of the plurality of baffle apertures is radially aligned with each radial layer of end windings; and positioning a spacer between adjacent end windings of the plurality of end windings, wherein the spacer defines a radial gap distance between the adjacent end windings, and wherein the radial gap is configured to allow the cooling fluid to flow within the radial gap and in contact with the adjacent stator end windings.

13. The method of claim 12, wherein the spacer is a temporary spacer, the method further comprising:

removing the spacer; and stiffening the layers of end windings of the plurality of radial layers of end windings such that the adjacent end winding layers maintain the radial gap without the spacer.

14. The method of claim 13, wherein removing the spacer occurs after stiffening the of the layers of end windings.

15. The method of claim 13, wherein stiffening the layers of end windings comprises vacuum pressure impregnation of a resin in the layers of end windings.

16. A stator comprising:

a stator core defining a longitudinal axis;

a plurality of stator end windings extending from the stator core along the longitudinal axis; and a baffle configured to separate a first volume of the stator including the plurality of stator end windings from a second volume of the stator extending longitudinally away from the baffle and the plurality of stator end windings and the stator core, and wherein:

the baffle comprises a plurality of baffle apertures configured to allow a cooling fluid to flow between the first volume and the second volume, adjacent end windings of the plurality of stator end windings define a radial gap, the plurality of stator end windings comprises a plurality of radial layers of end windings, each baffle aperture of the plurality of baffle apertures is radially aligned with each radial layer of end windings, the radial gap comprises a plurality of radial gaps defined by adjacent radial layers of the plurality of radial layers of end windings, and the radial gap is configured to allow the cooling fluid to flow within the radial gap and in contact with the adjacent stator end windings.

* * * * *